United States Patent
Michel et al.

(10) Patent No.: US 12,352,860 B2
(45) Date of Patent: Jul. 8, 2025

(54) LIDAR SYSTEM FOR ANEMOMETRIC MEASUREMENTS

(71) Applicant: OFFICE NATIONAL D'ETUDES ET DE RECHERCHES AÉROSPATIALES, Palaiseau (FR)

(72) Inventors: David Tomline Michel, Orsay (FR); Béatrice Augere, Palaiseau (FR); Matthieu Valla, Epinay sur Orge (FR)

(73) Assignee: Office National d'Etudes et de Recherches Aérospatiales, Palaiseau (FR)

( * ) Notice: Subject to any disclaimer, the term of this patent is extended or adjusted under 35 U.S.C. 154(b) by 783 days.

(21) Appl. No.: 17/761,953

(22) PCT Filed: Sep. 15, 2020

(86) PCT No.: PCT/FR2020/051591
§ 371 (c)(1),
(2) Date: Mar. 18, 2022

(87) PCT Pub. No.: WO2021/053290
PCT Pub. Date: Mar. 25, 2021

(65) Prior Publication Data
US 2022/0334256 A1  Oct. 20, 2022

(30) Foreign Application Priority Data
Sep. 20, 2019  (FR) .................. 19 10390

(51) Int. Cl.
*G01S 17/58* (2006.01)
*G01S 7/48* (2006.01)
*G01S 17/95* (2006.01)

(52) U.S. Cl.
CPC ............ *G01S 17/58* (2013.01); *G01S 7/4808* (2013.01); *G01S 17/95* (2013.01)

(58) Field of Classification Search
None
See application file for complete search history.

(56) References Cited

U.S. PATENT DOCUMENTS

| 4,995,720 A | 2/1991 | Amzajerdian |
|---|---|---|
| 5,317,376 A | 5/1994 | Amzajerdian |

(Continued)

FOREIGN PATENT DOCUMENTS

| CA | 2914527 A1 | 11/2014 |
|---|---|---|
| CN | 101268384 A | 9/2008 |

(Continued)

OTHER PUBLICATIONS

Bogue et al., "New optical airspeed sensor poised to cut airline costs", Sensor Review, vol. 25, No. 1, 2005, pp. 31-32.

(Continued)

*Primary Examiner* — Luke D Ratcliffe
(74) *Attorney, Agent, or Firm* — Maier & Maier, PLLC (57) ABSTRACT

A LIDAR system is adapted for performing anemometrical measurements relating to a focusing zone of a laser beam which is emitted by the system. The system includes a temporal control device for the laser beam, which is adapted for putting this laser beam in successive laser pulse form, so that each laser pulse has an individual length which is greater than or equal to twice the Rayleigh length divided by the propagation speed of the laser pulses in the atmosphere, and less than 20 μs. Advantageously, the individual length of each laser pulse is between 0.2 and 5 times the coherence time of the atmosphere which is effective in the focusing (Continued)

zone. Such a LIDAR system provides values for a spectral CNR ratio which are better than those of systems from the state-of-the-art, at equivalent spatial resolution.

20 Claims, 4 Drawing Sheets (56) References Cited

U.S. PATENT DOCUMENTS

| | | | |
|---|---|---|---|
| 9,435,890 | B2* | 9/2016 | Lacondemine ........... G01P 5/26 |
| 2009/0310118 | A1 | 12/2009 | Halldorsson |
| 2010/0277714 | A1 | 11/2010 | Pedersen |
| 2011/0181863 | A1* | 7/2011 | Renard .............. G01N 15/1434 356/28 |
| 2011/0188029 | A1 | 8/2011 | Schmitt |
| 2013/0142214 | A1 | 6/2013 | Schlotterbeck |
| 2015/0055115 | A1 | 2/2015 | Pedersen |
| 2015/0146199 | A1 | 5/2015 | Rondeau |
| 2016/0336167 | A1 | 11/2016 | Blondia |
| 2018/0358771 | A1 | 12/2018 | Quere |
| 2019/0285753 | A1 | 9/2019 | Spruit |

FOREIGN PATENT DOCUMENTS

| | | |
|---|---|---|
| CN | 103513257 A | 1/2014 |
| CN | 103 513 257 | 5/2015 |
| EP | 2 282 216 | 2/2011 |
| FR | 2 952 722 | 5/2011 |
| JP | 2011503526 A | 1/2011 |
| JP | 2015517094 A | 6/2015 |
| JP | 2019522779 A | 8/2019 |

OTHER PUBLICATIONS

Office Action with Search Report, issued in Chinese Patent Application No. 202080070044.5 dated Sep. 25, 2024.

Yu-Bao et al., "A Doppler Wind Lidar Based on Image-Reject Homodyne Technology", Transactions of Beijing Institute of Technology, vol. 38, No. 2, Feb. 2018, pp. 205-210.

International Search Report with translation for PCT/FR2020/051591 dated Dec. 4, 2020, 6 pages.

Written Opinion of the ISA for PCT/FR2020/051591 dated Dec. 4, 2020, 6 pages.

B. Augere, et al., 1.5 um lidar anemometer for true air speed, angle of sideslip, and angle of attack measurements on-board Piaggio P180 aircraft, Measurement Science and Technology, 2016, 11 pages.

N. Angelou et al., Direct measurement of the spectral transfer function of a laser based anemometer, Review of Scientific Instruments, AIP, Mar. 1, 2012, pp. 33111-33111, XP012162120.

Office Action, issued in Japanese Patent Application No. 2022-517462 dated Jan. 23, 2024.

* cited by examiner

LIDAR SYSTEM FOR ANEMOMETRIC MEASUREMENTS

This application is the U.S. national phase of International Application No. PCT/FR2020/051591 filed Sep. 15, 2020 which designated the U.S. and claims priority to FR 1910390 filed Sep. 20, 2019, the entire contents of each of which are hereby incorporated by reference.

BACKGROUND OF THE INVENTION

Field of the Invention

The present description relates to a LIDAR system which is adapted for conducting anemometrical measurements, and also a measurement process which uses such a system.

Description of the Related Art

LIDAR systems, for "Light Detection and Ranging," are well known and used in many applications, in particular for conducting anemometrical measurements. For an anemometrical speed measurement, the laser beam is backscattered by particles which are suspended in the air, such as aerosols or solid grains, and which are carried along by the air currents. Then, the component of the wind speed which is parallel to the laser beam is deduced from the frequency shift due to the Doppler effect. However, several reasons limit the performance of existing LIDAR systems which are used for anemometrical speed measurements. Among these reasons, one of the most constraining is the small value of the CNR spectral ratio, standing for spectral "carrier to noise ratio," which is written as CNR_sp ratio and which is the ratio of the maximum amplitude of the spectrum of the backscattered signal to the spectral noise, where this spectral noise is evaluated as the standard deviation of the spectral amplitude apart from the backscattered signal. This CNR_sp ratio is preferably higher than 3, in order to allow reliable determination of the Doppler shift, and subsequently of the anemometrical speed. This constraint on the CNR_sp ratio value is particularly severe for measurements which are carried out at altitude in the atmosphere, in particular for measurements carried out from an aircraft, and most particularly at altitude of more than 2 or 3 km (kilometer), because of the small concentrations of backscattering particles which exist at such altitudes.

A first type of LIDAR systems which are used for anemometrical measurements is based on continuous laser sources, such as laser diodes. In this case, the portion of the atmosphere which is involved in the measurement is selected by providing the emitted laser beam with a convergent beam shape. The laser beam therefore converges into a focusing zone, and then diverges, with the beam possibly described by a Gaussian beam structure. The focusing zone has a length measured parallel to the central propagation direction of the laser beam which is equal to twice the Rayleigh length, i.e. equal to $2\cdot\lambda/(\pi\cdot\theta^2)$, and a minimum radius, called "waist", which is equal to $\lambda/(\pi\cdot\theta)$, where $\lambda$ is the wavelength of the laser beam and $\theta$ is the divergence half-angle, expressed in radians, of the laser beam beyond the focusing zone on the side opposite the laser emission source. Typically, the divergence half-angle $\theta$ is the angular half opening of the laser beam as it exists at 2 km beyond the focusing zone. Under these conditions, the part of the laser beam which is backscattered originates mainly from the focusing zone, so that the results of the LIDAR measurement concerns the wind speed as it exists in the focusing zone. But the principle of selection of the focusing zone by the divergence of the laser beam establishes a correlation between the size of this focusing zone and the separating distance between this focusing zone and the LIDAR system. In practice, when the outlet pupil of the LIDAR system has a radius of 0.10 m (meter), this separating distance of the focusing zone relative to the LIDAR system may be several hundreds of meters, for example 300 m for a focusing zone length which is then about 50 m.

Furthermore, and also in a known manner, the detection signal processing for such a LIDAR system with continuous emission proceeds by dividing the detection signal into successive and separate time windows, for example with a length of each time window which may be equal to 1 μs (microsecond). To improve the value of the CNR_sp ratio which is obtained for each time division window, spectral amplitude values which result separately for N successive time windows, where N is a positive integer, are combined into an average value which constitutes the measurement result. But given that the detection values which are thus added to get the measurement result from mutually incoherent detection signals, the CNR_sp ratio relating to the measurement result is increased by a factor of $N^{1/2}$ compared to the value of the CNR_sp ratio relating to each detection value. For example, for 100 detection values which are thus combined, the CNR_sp ratio improves by a factor of 10. However, such improvement may be insufficient for anemometrical measurement conditions where the CNR_sp ratio of one detection value is particularly low, for example at altitude of more than 2 to 3 km where the backscattering coefficient of the laser beam by the particles which are in suspension in the air may be very low. Alternatively, using a very large value for the number N requires a very long effective measurement time, which may be incompatible with some applications, such as conducting real-time anemometrical measurements from an aircraft, for example.

In LIDAR systems of a second type, the laser emission source is a pulse source, and the radiation which is emitted into the atmosphere as pulses has a collimated beam structure. The length of each laser emission pulse may for example be between 0.15 μs and 1 is. Then, the portion of the atmosphere which is involved by each measurement is a cylinder whose diameter is that of the collimated laser beam and whose length along the direction of propagation of the laser pulses corresponds to the length of a detection time window which is associated with each backscattered radiation pulse multiplied by C/2, where C is the propagation speed of the radiation in the atmosphere. Simultaneously, the distance between the portion of the atmosphere which is involved in the measurement and the LIDAR system is determined by a controlled delay between the emission of a pulse and the corresponding detection time window. If the length of each laser pulse is short, for example of the order of 0.15 is, the spatial resolution is fine, but the value of the CNR_sp ratio is then low and causes, by spectral broadening, an uncertainty in the measurement result of the anemometrical velocity component which is parallel to the direction of propagation of the laser pulses. On the other hand, if each pulse of laser radiation is too long, for example of the order of 1 is, the CNR_sp ratio is increased, the spectral broadening is reduced, but the spatial resolution is degraded. This therefore results in a constraining trade-off between spatial resolution, value of the CNR_sp ratio and precision of the measured anemometrical speed value.

For the LIDAR systems of the second type, the CNR_sp ratio may also be increased by averaging N separated elementary measurements, where each elementary measurement results from a distinct laser pulse and from the detection of the backscattered radiation that corresponds to this laser pulse. But since the elementary measurements which are thus combined originate from mutually independent signals, the CNR_sp ratio of the average result is again only increased by a factor of $N^{1/2}$.

Other limitations of the performance of the LIDAR systems for anemometrical measurements may be, depending on the nature of the LIDAR system which is used: the measurement time, the weight and volume of the system, the sensibility for the small anemometrical speed values, etc.

From this situation, one object of the present invention is to make it possible to perform anemometrical measurements that exhibit CNR_sp ratio values which are better than those of prior systems, while retaining a good spatial resolution.

An additional object of the invention is to allow such measurements which further have a good precision in the anemometrical speed values which constitute the measurement results.

Another additional object of the invention is to make it possible to perform measurements with a measurement time that is not too long.

Finally other additional objects of the invention are to require a LIDAR system which is low-weight and low-volume, preferably low-cost, and which has a good sensitivity for small anemometrical speed values.

SUMMARY OF THE INVENTION

To achieve at least one of these objects or another, a first aspect of the invention proposes a new LIDAR system which is adapted for performing anemometrical measurements, and which comprises:

a source of laser emission, capable of producing a laser beam towards a portion of atmosphere outside the LIDAR system, so that the laser beam is convergent at an outlet pupil of the laser emission source, and has a transverse beam section which is minimum at mid-length of a focusing zone of the laser beam, where this focusing zone has a length equal to $2 \cdot \lambda/(\pi \cdot \theta^2)$, measured parallel to a central propagation direction of the laser beam, where $\lambda$ is a wavelength of the laser beam and $\theta$ is a divergence half-angle of the laser beam beyond the focusing zone on a side opposite the laser emission source, expressed in radians, where $\lambda/(\pi \cdot \theta^2)$ is called the Rayleigh length;

a heterodyne detection assembly, arranged for receiving a part of the laser beam which is backscattered by particles contained in the focusing zone; and a Doppler calculation module, adapted for deducing a speed value for the particles from a beat signal which is produced by the heterodyne detection assembly.

In other words, the LIDAR system of the invention is similar to the type based on a continuous emission laser source such as presented above. In particular, the atmospheric portion which is the subject of the anemometrical measurement is the focusing zone as determined by the convergent structure of the laser beam at the outlet pupil of the laser emission source.

The divergence half-angle $\theta$ of the laser beam is the angle at which there is a point where the intensity of the beam is equal to $1/e^2$ times a maximum intensity value of the beam, inside a characterization plane which is perpendicular to the central propagation direction of the laser beam, and which is located 2 km downstream from a striction plane where the laser beam has a transverse section size which is minimum, along the direction of propagation of the laser beam. Furthermore, the half-angle $\theta$ is measured relative to the central direction of propagation with the apex at the point of intersection between this central direction of propagation and the striction plane.

The particles which backscatter a part of the laser beam may be any kind, in particular solid particles or aerosols which are suspended in the air, such as dust, micrograins, ice microcrystals, water droplets, etc.

According to the invention, the LIDAR system furthermore comprises:

a temporal control device for the laser beam, which is adapted for putting this laser beam in successive laser pulse form, and which is combined with the laser emission source so that the laser pulses pass through the focusing zone, with a part of each laser pulse backscattered by the particles. This temporal control device is furthermore adapted so that each laser pulse has an individual length which is greater than or equal to twice the Rayleigh length divided by the propagation speed of the laser pulses in the atmosphere, and less than 20 µs, preferably less than 10 µs.

The individual length of a laser pulse is the time between a first instant when the power of the laser beam rises through a level equal to half of a maximum power value which is reached during the laser pulse, and a second instant when the power of the laser beam falls through the level equal to half of the maximum power value. In other words, the individual length of a laser pulse is defined as being its width at mid-height, in terms of length and instantaneous radiation power.

Thanks to using the temporal control device for the laser beam, the length of each laser beam pulse is adjusted so that the heterodyne detection assembly receives radiation which is backscattered from the entire focusing zone, in the same way as a continuous emission LIDAR system. In this way, an intensity of the detection signal affected by the Doppler effect may be maximized.

Furthermore, the temporal control device for the laser beam, which determines the successive laser pulses, allows eliminating contributions to the backscattering which could be produced with time offsets greater than the atmospheric coherence time. Such an atmospheric coherence time is caused in particular by local movements of the atmosphere.

Again furthermore, thanks to the 20 µs maximum value, the temporal control device for the laser beam which determines the successive laser pulses allows eliminating contributions to the backscattering which could be produced by clouds located in the background of the focusing zone, in which the backscattering particles would have a much higher concentration compared to the focusing zone. In this way, using a pulsed laser beam allows ensuring that the detection signal does originate from the focusing zone.

Finally, using laser pulses allows accessing radiation power values within each pulse which are greater than available power values for continuous laser radiation. Thus, the CNR_sp ratio, which is proportional to the intensity of the radiation which is backscattered and collected by the heterodyne detection assembly, may have a larger value. For this reason, the LIDAR system of the invention may be used under conditions where the backscattering coefficient of the atmosphere is low or very low, in particular from an aircraft at 2 km altitude or higher.

For the same reason, a LIDAR system complying with the invention makes it optional to average several measurement results obtained from separate laser pulses, or allows implementing such averaging operation on a small number of pulses, so that the time necessary to get a final measurement result may be particularly short.

Furthermore, the LIDAR system of the invention does not necessitate a trade-off between spatial resolution and precision of the measured anemometrical speed values, in contrast to pulsed LIDAR systems where the spatial selectivity results from the length of the pulses.

Preferably, the temporal control device for the laser beam may be adapted so that each laser pulse has an individual length which is equal to three times the Rayleigh length divided by the propagation speed of the laser pulses in the atmosphere.

In particular the temporal control device for the laser beam may be adapted so that the individual length of each laser pulse is between 0.2 µs and 5 µs, preferably between 0.5 µs and 1.2 µs. Such laser pulse length suits indeed when the atmospheric coherence time is substantially equal to 1 µs.

In particular embodiments of the invention, at least one of the following additional features may optionally be reproduced, alone or in combination of several of them:
  the temporal control device for the laser beam may comprise at least one component selected among an acoustical-optical modulator, an electro-optical modulator, a semiconductor optical amplifier, a lighting and extinction system for the laser emission source, and an eigenmode selection system for a laser amplification cavity. However, any other temporal control device for the laser beam may alternatively be used such as for example an optical, electronic or electro-optical switching system;
  the temporal control device for the laser beam may be incorporated in the laser emission source, or may be arranged for acting on a control input of the laser emission source, or even be arranged downstream from the laser emission source relative to a propagation direction of the radiation in order to modify at least one time distribution feature of the laser beam after this laser beam has been produced by the laser emission source;
  the laser emission source may be of a continuous emission type and the temporal control device for the laser beam may be adapted for dividing this laser beam into successive laser pulses. Alternatively, the laser emission source may be of a type emitting in the form of successive laser pulses, and the temporal control device for the laser beam may then be adapted for modifying, in particular increasing, a length of each laser pulse. Other combinations of laser emission source type and temporal control device type for the laser beam which is emitted by the source considered may again be used alternatively;
  the system may furthermore be adapted for applying a frequency offset between each laser pulse and a reference laser signal which is used by the heterodyne detection assembly, so that a zero speed of the particles which are contained in the focusing zone relative to the LIDAR system corresponds to a nonzero frequency for the beat signal produced by the heterodyne detection assembly. Such improvement is particularly advantageous for measuring anemometrical speeds which are low, for example for applications on the ground such as optimization of wind turbine operation or for measurements performed from an aircraft which can remain in stationary or nearly stationary flight;
  the laser emission source may be of fiber-optic type, and be adapted so that each laser pulse has an average power of between 100 W (watt) and $5 \cdot 10^5$ W, preferably between 200 W and 2000 W. Such optical fiber laser emission sources are low-weight and low-volume, so that the LIDAR system can easily be installed on board an aircraft;
  the wavelength of the laser emission source may be between 1.5 µm and 1.7 µm, within a transparency spectral domain of the atmosphere, and possibly also within a transparency spectral domain of optical fibers which are used in the LIDAR system. Such wavelength has the advantage of limiting ocular hazards;
  the time control device for the laser beam may be adapted so that two successive laser pulses are separated by a duration which is between 3 µs and 500 µs, preferably less than 100 µs. It is thus possible to get greater laser pulse power values;
  the LIDAR system may be adapted for simultaneously emitting laser pulses along several measurement directions which are distributed about a central direction, with an angle for each measurement direction relative to the central direction which is less than 30° so as to get respective values for three coordinates of the velocity of the particles. It is thus possible to simultaneously characterize the wind velocity components along three orthogonal spatial coordinates, i.e. in three dimensions; and
  the laser emission source may comprise a variable focusing device adapted for varying a measurement distance existing between the outlet pupil of this laser emission source and a central point of the focusing zone, for example between 200 m and 1000 m.

A second aspect of the invention proposes an aircraft which is equipped with a LIDAR system according to the first aspect of the invention, where this LIDAR system is installed on board the aircraft for performing anemometrical measurements during a flight of this aircraft. The aircraft may in particular be an airplane, helicopter, drone, whatever type of drone, in particular with fixed supporting wings or multi-copter type.

Finally, a third aspect of the invention relates to an anemometrical measurement process, which comprises the following steps:
  arranging a LIDAR system which complies with the first aspect of the invention, so that the focusing zone is contained in an atmospheric portion where an anemometrical speed is to be measured;
  adopting an individual laser pulse length which is greater than or equal to twice the Rayleigh length divided by the propagation speed of the laser pulses in the atmosphere; and less than 20 µs, preferably less than 10 µs; and
  activating the LIDAR system to get a speed value for particles which are contained in the focusing zone.

Preferably, the temporal control device for the laser beam may be adjusted so that the individual length of each laser pulse is between 0.2 and 5 times, preferably between 0.5 and 1.2 times, the coherence time of the atmosphere which is effective in the focusing zone.

BRIEF DESCRIPTION OF THE DRAWINGS

The features and advantages of the present invention will appear more clearly in the following detailed description of non-limiting implementation examples with reference to the attached drawings in which.

DETAILED DESCRIPTION OF THE INVENTION

For clarity reasons, the dimensions of elements which are shown in these figures do not correspond either to real dimensions, or to real dimension ratios. Furthermore, some of these elements are only shown symbolically, and identical references which are indicated in different figures designate elements that are identical or have identical functions.

Figure 1:
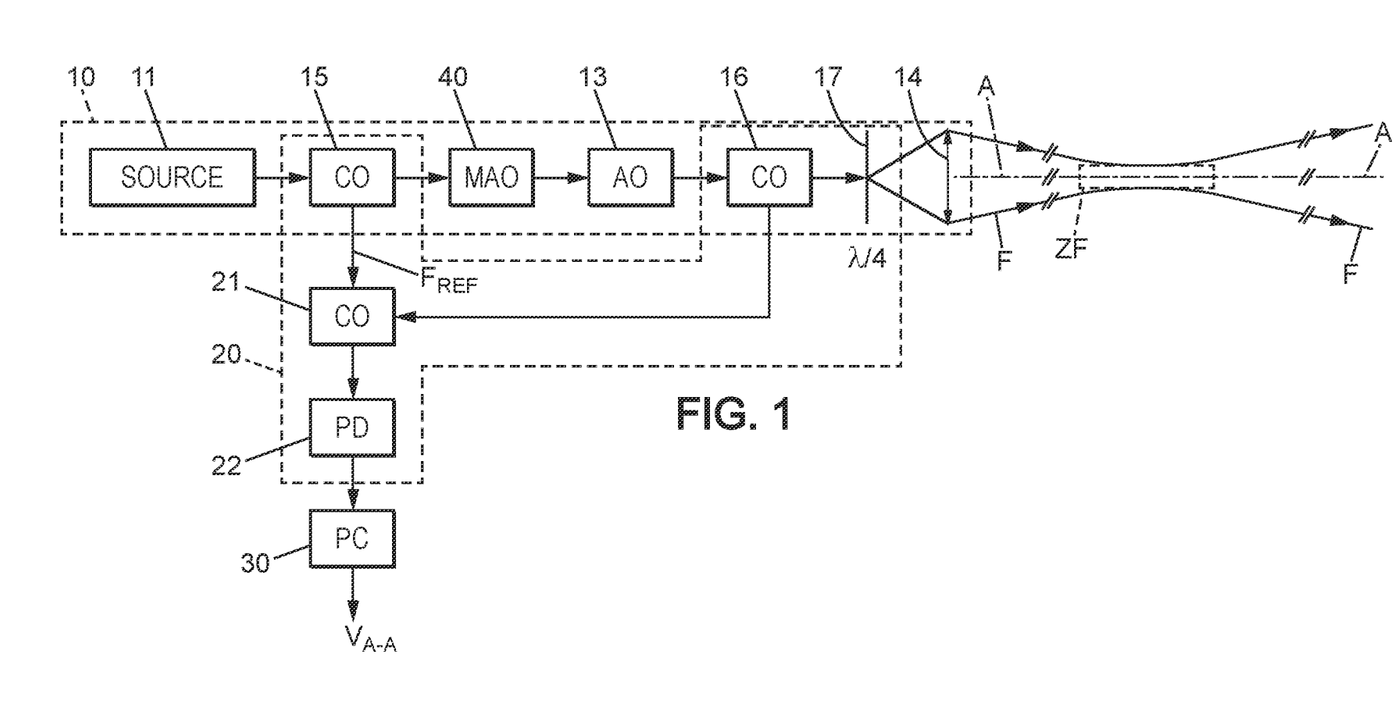
FIG. 1 is a block diagram of a LIDAR system complying with the invention.

The LIDAR system according to the invention that is shown in FIG. 1 may be comprised of the continuous emission LIDAR system. It comprises a laser emission source 10, a heterodyne detection system 20, and a Doppler calculation module 30.

Figure 2:
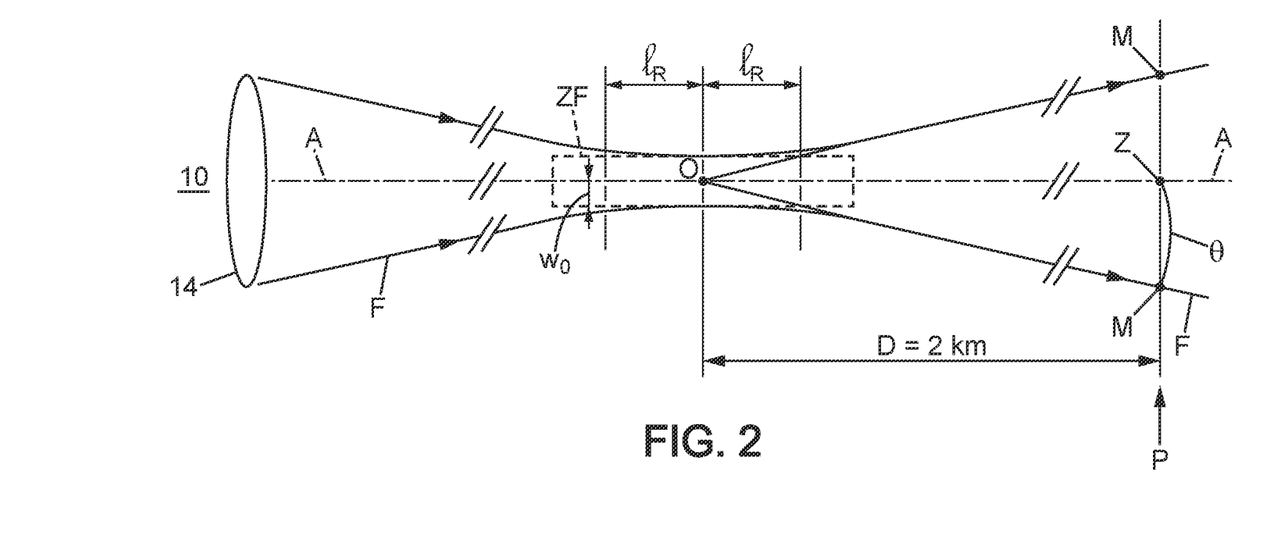
FIG. 2 shows various geometric parameters of a laser beam such as produced by the LIDAR system of FIG. 1.

The laser emission source 10 may comprise an initial laser source 11, referenced SOURCE, an optical amplifier 13, referenced AO, and an optical outlet 14. The laser emission source 10 is thus designed for producing a laser beam F which has a convergent beam structure in a space area after the optical outlet 14. In this way, the beam F, with optical axis A-A, has transverse sections which decrease between the optical outlet 14 and a focusing zone referenced ZF, and which then increase in the form of a divergent beam beyond this focusing zone ZF. In a known manner, the focusing zone ZF may be compared to a cylinder with axis A-A, radius $w_0=\lambda/(\pi\cdot\theta)$, commonly called "waist," and length $2 \cdot l_R$, where $l_R$ is the Rayleigh length equal to $\lambda/(\pi\cdot\theta^2)$, and where $\theta$ is the divergence half angle of the laser beam F beyond the focusing zone the ZF, expressed in radians. Typically, the distance between the optical outlet 14 and the focusing zone ZF may be from several hundred meters to more than 1 km, the Rayleigh length may be from several meters to 200 m and the $w_0$ radius of the order of 1 cm. The wavelength of the laser emission source 10 may be of the order of 1.55 µm, for example. Generally, the divergence half-angle $\theta$ of the laser beam F may be evaluated downstream from the focusing zone ZF in the propagation direction of the beam, at a distance D from the center O of the focusing zone ZF which is equal to 2 km. More precisely, within the transverse section plane P of the beam F which is located at the distance D from the center O, on the side opposite the optical outlet 14, $\theta$ is the apex half angle of the cone with apex O which comprises the points M of the plane P where the intensity of the laser radiation is reduced by a factor $1/e^2$ relative to the value thereof at the point Z of intersection between the plane P and the axis A-A, where e is the base of the natural logarithm. FIG. 2 shows these parameters of the laser beam F as produced by the source 10. The optical axis A-A constitutes the central propagation direction of the beam F. The outlet optics 14 may in particular be comprised of a convergent lens and determine the dimension of the outlet pupil of the laser emission source 10. For example, this outlet pupil may have a radius of about 0.07 m.

The heterodyne detection assembly 20 may comprise a photodetector 22, referenced PD, optical couplers 15, 16 and 21, referenced CO, and a quarter wave plate 17, referenced λ/4, which are arranged for combining a backscattered part of the laser beam F with a part $F_{REF}$ of the laser beam as produced by the initial laser source 11. This part $F_{REF}$ of the laser beam as produced by the initial laser source 11 serves as a reference laser signal, as indicated in the general part of the present description. In a known way, the backscattered part of the laser beam F which is thus detected essentially originates from the focusing zone ZF, and is produced by backscattering particles which are located in this zone.

Finally, the Doppler calculation module 30 may be comprised of a computer unit referenced PC, hosting an appropriate program for processing signals delivered by the photodetector 22. It outputs an evaluation of the velocity component of the backscattering particles which are in the focusing zone ZF, this component being parallel to the axis A-A and referenced $V_{A-A}$.

The operation of such LIDAR system is very well-known to the person skilled in the art, so that it is not necessary to repeat it here. Similarly, the use of this LIDAR system for anemometrical speed measurements is also known. In this case, the laser emission source 10 is oriented so that the focusing zone ZF is in the portion of the atmosphere where the speed of the wind is to be characterized, and the particles which backscatter the laser beam M are dusts, microcrystals or aerosol droplets which are suspended in the atmosphere within the focusing zone ZF.

According to the invention, a temporal control device 40 for the laser beam F is added to the LIDAR system which was just described, for example within the laser emission source 10, between initial laser source 11 and the optical amplifier 13, for dividing the laser beam F into successive laser pulses. For example, the device 40 may be comprised of an acoustic-optical modulator, referenced MAO, with an appropriate command unit thereof. Alternatively, the temporal control device 40 for the laser beam F may be based on an electro-optical modulator, a semiconductor optical amplifier such as currently designated by SOA, or a lighting and extinction system for the laser emission source 10. In alternative embodiments, the temporal control device 40 may be integrated in the laser emission source 10. For example, the laser emission source 10 may comprise a multimode laser amplification cavity, for which one eigenmode may be selected by an excitation source which injects an initial radiation in this laser amplification cavity. In such a case, the excitation source itself may be an adjustable pulse laser source. The laser beam F which originates from the laser amplification cavity is then comprised of successive pulses, which correspond one-to-one to the pulses of the excitation source.

Generally, in a LIDAR system according to the invention, the laser pulses which are controlled by the device 40 have an individual length which is less than 20 is. Such maximum value ensures that an atmospheric portion which might be located on the A-A axis in the background of the focusing zone ZF, at a large distance therefrom, and which could have a large backscattering power, as a cloud for example, does not contribute to the detected signal in superposition with the signal from the focusing zone ZF.

In the context of the invention, the length of a laser pulse is defined, relative to its maximum instantaneous power value, as being the duration which separates a moment when the pulse begins as the instantaneous power value rises above half of the maximum instantaneous power value, and a moment when the pulse ends as the instantaneous power value again falls below half of the maximum instantaneous power value.

Furthermore, according to the invention, the laser pulses which are controlled by the device 40 have an individual length which is greater than or equal to twice the Rayleigh length $l_R$ divided by the propagation speed of the laser pulses in the atmosphere. In that way, the space selectivity for the atmosphere portion for which the anemometrical speed measurement is carried out, is again determined by the focusing zone ZF, in the same way as described above for a continuous emission LIDAR system. When the Rayleigh length is equal to 50 m, the individual laser pulse length must thus be longer than 0.33 µs. For example, the individual length of each laser pulse may be equal to three times the Rayleigh length $l_R$ divided by the propagation speed of the laser pulses in the atmosphere, i.e. 1 µs for $l_R$=50 m.

Simultaneously, and for an optimized use of such LIDAR system with the goal of measuring anemometrical speed, the length of each pulse may furthermore be selected for being between 0.2 and 5 times, preferably between 0.5 and 1.2 times, an effective coherence time of the atmosphere in the focusing zone ZF. Such a coherence time depends in particular on movements of the particles which produce the backscattering of the laser radiation. If this coherence time of the atmosphere is substantially equal to 1 µs, then the individual length of each laser pulse is preferably selected between 0.2 µs and 5 µs, and even more preferably between 0.5 µs and 1.2 µs.

With such pulse emission operation, instantaneous laser beam power values, inside each rectangular profile pulse, may be used which are between 100 W and $5 \cdot 10^5$ W, for example equal to 500 W. Such values are inaccessible for continuous laser radiation, considering the optical amplification components which are available or compatible with the applications considered.

Figure 3:
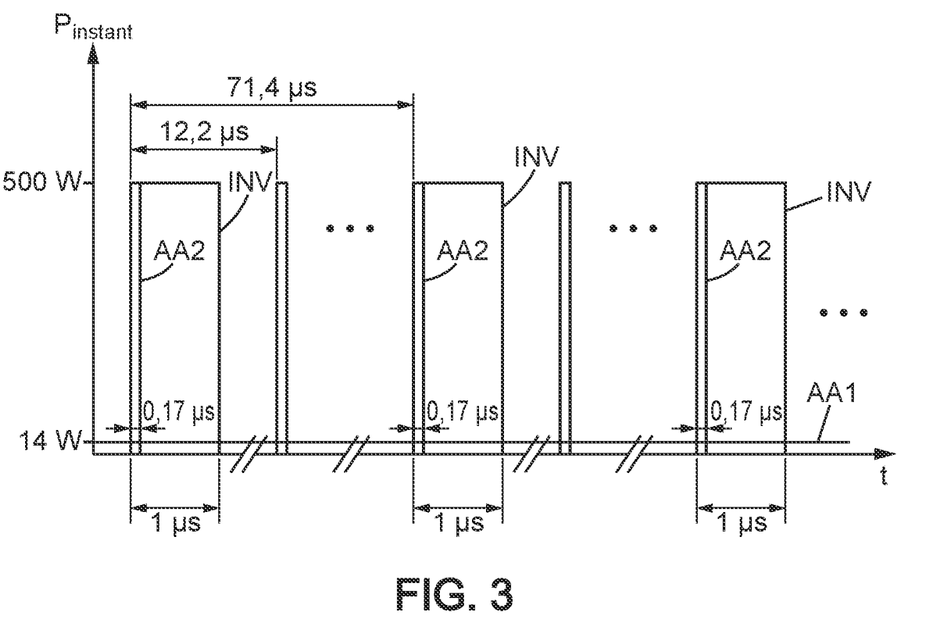
FIG. 3 is a time diagram which compares a possible laser emission for the LIDAR system of FIG. 1, with laser emissions of LIDAR systems known from prior art.

The diagram of FIG. 3 compares pulse laser emission of the LIDAR system for anemometrical speed measurements, which was just described and which conforms to the invention, with two other systems known from prior art. The horizontal axis shows the time, referenced t, and the vertical axis shows the instantaneous emitted power values, referenced $P_{instant}$. The pulses referenced INV correspond to a possible laser emission into the atmosphere for the system from the invention: it is comprised of successive rectangular pulses with individual lengths equal to 1 µs, and instantaneous power equal to 500 W, with another pulse every 71.4 µs. Such emission operation corresponds to an average continuous power of about 7 W. The value of the resulting CNR_sp ratio which is obtained with such LIDAR system according to the invention, focused at 300 m from the optical outlet 14 and having a laser beam F radius of 5 cm at this optical outlet, is 8.6 for a backscattering coefficient β of the atmosphere in the focusing zone of the laser beam F that equals $2 \cdot 10^{-10}$ str$^{-1}$ m$^{-1}$ (str is for steradian). These conditions correspond to a space resolution equal to twice the Rayleigh length $l_R$, of approximately 40 m, and the value of 8.6 for the CNR_sp ratio is obtained by integration of the signal over 0.1 s, i.e. by combining Z=1400 successive pulses.

The line referenced AA1 in FIG. 3 corresponds to a continuous emission LIDAR system with 14 W power. In order to obtain a CNR ratio value which is equivalent to that of the system according to the invention (INV pulses), the measurements carried out for N=1,764,000 successive division time windows must be combined, corresponding to an increase of the CNR_sp ratio which is proportional to the square root of the number of measurements N, compared to the value of the CNR_sp ratio relating to each individual measurement. Thus, if each division time window has an individual duration of 1 µs, the duration of one measurement cycle corresponding to CNR_sp=8.6 is 1.764 s. Put another way, for a measurement cycle of equal duration, the system of the invention allows increasing the CNR_sp ratio by a multiplicative factor which is substantially equal to 4.2, as compared to a LIDAR system with continuous emission.

The pulses referenced AA2 in FIG. 3 correspond to a pulsed LIDAR system, whose emission is comprised of successive rectangular pulses with individual lengths equal to 0.17 µs, and instantaneous power equal to 500 W, with another pulse every 12.2 µs. Such emission operation corresponds to an average continuous power of 7 W and to a 40 m space resolution, i.e. continuous average power and space resolution values which are identical to those of the LIDAR system of the invention with the INV pulses. The radius of the laser beam at the optical outlet, for the pulsed LIDAR system considered, is 4.1 cm. In order to get the same CNR_sp ratio value as this system of the invention, measurements carried out separately for N=524,800 successive AA2 pulses have to be combined, again corresponding to an increase of the CNR_sp ratio which is proportional to the square root of the number of measurements N. Hence, the duration of a measurement cycle corresponding to CNR_sp=8.6 for such a pulsed LIDAR system is 6.4 seconds. Furthermore, the fact of using short pulses broadens the measured spectrum, which causes a reduction of the precision of the measured speed value. In order to keep a precision in the speed value which is equivalent to that of the LIDAR system of the invention, it would be necessary to combine measurements carried out separately for N=20,500,000 successive AA2 pulses, corresponding to 250 s measurement duration.

The invention therefore enables reducing the effective duration of a measurement relative to the prior systems at equal values of the CNR_sp ratio.

Figure 4:
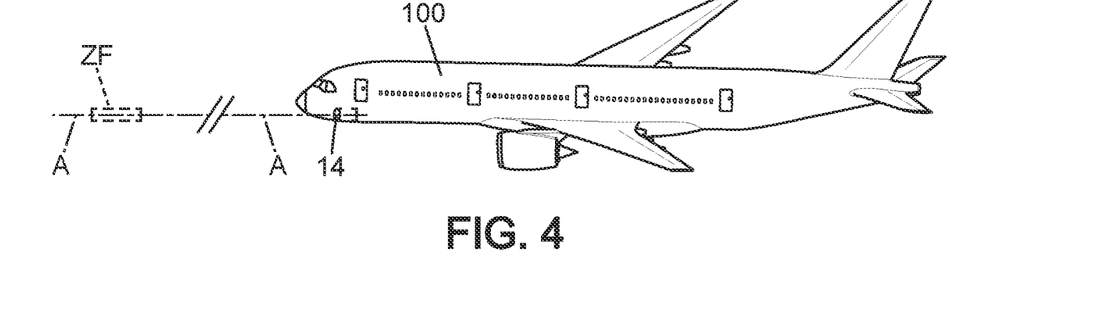
FIG. 4 illustrates a possible application of the LIDAR system of FIG. 1.
Figure 5:
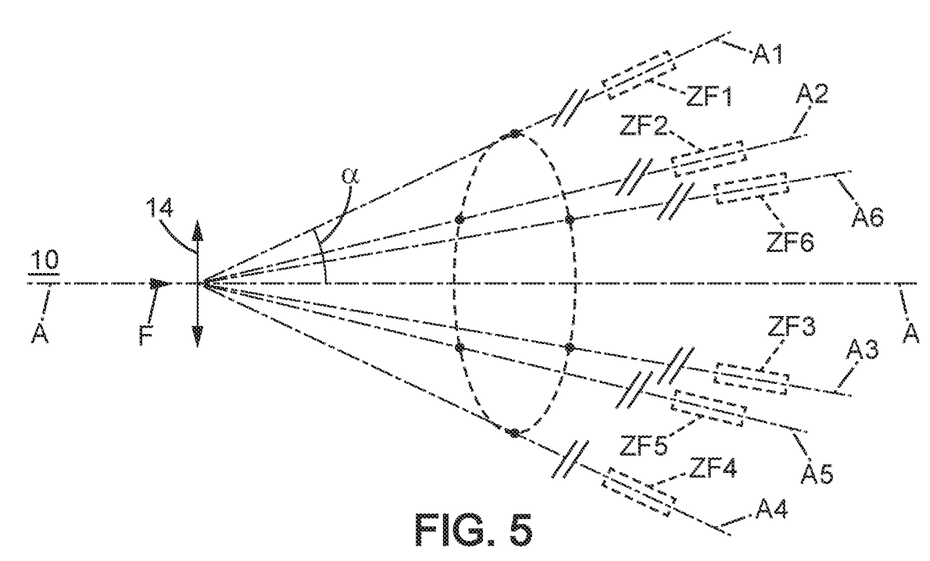
FIG. 5 illustrates an improvement of the invention, in order to perform three-dimensional anemometrical measurements.

A LIDAR system which complies with the invention and which is particularly adapted for measuring anemometrical speed, may be used in many applications, among them without limitation:

applications on board an aircraft, for which reduced LIDAR system volume and weight constitute significant advantages. Then, the laser emission system 10, the heterodyne detection assembly 20 and the temporal control device 40 may be implemented in whole or in part based on optical fibers. FIG. 4 shows an airplane 100 which is equipped with such a LIDAR system for measuring anemometrical speed according to the invention. The system is preferably installed on board the airplane so that the outlet optics 14 are located towards the nose of the aircraft 100 and turned towards the half-space in front of the aircraft. FIG. 4 shows the arrangement of the central propagation direction A-A and of the focusing zone ZF which results therefrom;

applications for which the anemometrical speed to be measured may be low, such as measurements near the ground or at low altitude, for example in order to optimize wind turbine operation, or even for measurements from aircraft which may be in stationary flight. In this case, the acoustic-optical modulator 40 may further generate a frequency offset which is applied to the laser beam F, without being applied to the part of the laser beam $F_{REF}$ which is sampled from the initial source 11 by the optical coupler 15, and which is used as a reference laser signal for the heterodyne detection. In this way, a low anemometrical speed value corresponds to a heterodyne beat frequency which is near a fixed nonzero value, so that the measurement precision is improved without requiring implementing an excessively long sampling time;

applications for which the measurement distance, between the outlet optics 14 and the focusing zone ZF, must be variable. To this end, the outlet optics 14 may be adapted for varying the convergence of the laser beam F on request as it exits through this optics. For example, when the laser beam F originates from one end of an optical fiber, the outlet optics 14 may be a convergent lens mounted on a support which is mobile in translation parallel to the axis A-A, so as to move the object focus point of the lens relative to the end of the optical fiber. In that way, the central point O of the focusing zone ZF may be located at a distance from the outlet optics 14 which can be controlled, for example between 200 m and 1000 m. In particular, when this distance is equal to 200 m and the radius of the laser beam F at the outlet pupil is equal to 0.08 m, the Rayleigh length may be of the order of 6 m, and when the measurement distance between the outlet optics 14 and the central point O of the focusing zone ZF is equal to 1000 m, the Rayleigh length may be of the order of 150 m, again for an 8 cm radius of the laser beam F at the outlet pupil;

applications for which measurements of three components of the velocity of the wind are necessary. To this end, the laser beam F may be divided into at least three sub-beams which have different central directions of propagation. The laser pulses emitted according to the invention from the beam F are therefore also divided sequentially or simultaneously each along at least three emission paths directed towards separated focusing zones. The analysis by inverse Doppler effect calculation for the radiation parts which are backscattered from the different focusing zones provides a measurement of anemometrical velocity components which are parallel to the central directions of propagation. Then, by assuming that the speed of the wind, as a vector quantity, is the same in all the focusing zones, it is easy to deduce evaluations of components of the wind speed along three axes of an orthogonal reference frame. The person skilled in the art knows how to perform such a transformation of axes for coordinates of a vector velocity. For example, referring to FIG. 5, the laser beam F with axis A-A is divided into six laser sub-beams which are angularly distributed on the surface of a cone with a half-angle of opening at the apex, a, that is for example equal to 15° (degree). The respective central directions of propagation of the six lasers sub-beams are referenced A1-A6, and the corresponding focusing zones are referenced ZF1-ZF6. The directions A1-A6 are then measurement directions for the components of the wind speed, and are distributed about the central direction formed by the axis A-A.

It is understood that the invention may be reproduced by modifying secondary aspects of the embodiments which have been described in detail above, while retaining at least some of the advantages indicated above. In particular, the numerical values which have been were only provided for illustration and may be changed according to the application considered.

The invention claimed is:

1. A LIDAR system adapted for performing anemometrical measurements, comprising:
    a source of laser emission, capable of producing a laser beam towards a portion of atmosphere outside the LIDAR system, so that said laser beam is convergent at an outlet pupil of the laser emission source, and has a transverse beam section which is minimum at mid-length of a focusing zone of said laser beam, wherein said focusing zone has a length equal to $2 \cdot \lambda/(\pi \cdot \theta^2)$, measured parallel to a central propagation direction of the laser beam, wherein $\lambda$ is a wavelength of the laser beam and $\theta$ is a divergence half-angle of said laser beam beyond the focusing zone on a side opposite the laser emission source, expressed in radians, where $\lambda/(\pi \cdot \theta^2)$ is called the Rayleigh length;
    a heterodyne detection assembly, arranged for receiving a part of the laser beam which is backscattered by particles contained in the focusing zone; and
    a Doppler calculation module, adapted for deducing a speed value for the particles from a beat signal which is produced by the heterodyne detection assembly,
wherein the LIDAR system further comprises:
    a temporal control device for the laser beam, which is adapted for putting this laser beam in successive laser pulse form, and which is combined with the laser emission source so that the laser pulses pass through the focusing zone, with a portion of each laser pulse backscattered by the particles, where the temporal control device is furthermore adapted so that each laser pulse has an individual length which is greater than or equal to twice the Rayleigh length divided by a propagation speed of the laser pulses in the atmosphere, and less than 20 µs.

2. The LIDAR system according to claim 1, wherein the temporal control device is adapted so that each laser pulse has an individual length which is equal to three times the Rayleigh length divided by the propagation speed of the laser pulses in the atmosphere.

3. The LIDAR system according to claim 2, wherein the temporal control device is adapted so that the individual length of each laser pulse is between 0.2 µs and 5 µs.

4. The LIDAR system according to claim 2, wherein the temporal control device for the laser beam comprises at least one component selected among an acoustical-optical modulator, an electro-optical modulator, a semiconductor optical amplifier, a lighting and extinction system for the laser emission source, and an eigenmode selection system for a laser amplification cavity.

5. The LIDAR system according to claim 1, wherein the temporal control device is adapted so that the individual length of each laser pulse is between 0.2 µs and 5 µs.

6. The LIDAR system according to claim 5, wherein the temporal control device for the laser beam comprises at least one component selected among an acoustical-optical modulator, an electro-optical modulator, a semiconductor optical amplifier, a lighting and extinction system for the laser emission source, and an eigenmode selection system for a laser amplification cavity.

7. The LIDAR system according to claim 1, wherein the temporal control device for the laser beam comprises at least one component selected among an acoustical-optical modulator, an electro-optical modulator, a semiconductor optical amplifier, a lighting and extinction system for the laser emission source, and an eigenmode selection system for a laser amplification cavity.

8. The LIDAR system according to claim 1, furthermore adapted for applying a frequency offset between each laser pulse and a reference laser signal which is used by the heterodyne detection assembly, so that a zero speed of the particles which are contained in the focusing zone relative to the LIDAR system corresponds to a nonzero frequency for the beat signal produced by said heterodyne detection assembly.

9. The LIDAR system according to claim 1, wherein the laser emission source is of fiber-optic type, and is adapted so that each laser pulse has an average power between 100 W and $5 \cdot 10^5$ W.

10. The LIDAR system according to claim 9, wherein the laser emission source is adapted so that the average power of each laser pulse is between 200 W and 2000 W.

11. The LIDAR system according to claim 1, wherein the time control device for the laser beam is adapted so that two successive laser pulses are separated by a duration which is between 3 µs and 500 µs.

12. The LIDAR system according to claim 11, wherein the time control device for the laser beam is adapted so that the duration between two successive laser pulses is less than 100 µs.

13. The LIDAR system according to claim 1, arranged for simultaneously emitting laser pulses along several measurement directions which are distributed about a central direction, with an angle for each measurement direction relative to the central direction which is less than 30°, so as to get respective values for three coordinates of the velocity of the particles.

14. The LIDAR system according to claim 1, wherein the laser emission source comprises a variable focusing device arranged for varying a measurement distance existing between the outlet pupil of said laser emission source and a central point of the focusing zone.

15. The LIDAR system according to claim 14, wherein the measurement distance existing between the outlet pupil of the laser emission source and the central point of the focusing zone is between 200 m and 1000 m.

16. An aircraft, equipped with a LIDAR system complying with claim 1, wherein said LIDAR system is installed on board the aircraft in order to perform anemometrical measurements during flight of said aircraft.

17. An anemometrical measurement process comprising the following steps:
   arranging a LIDAR system which complies with claim 1, so that the focusing zone is contained in an atmospheric portion where an anemometrical speed is to be measured;
   adopting an individual laser pulse length which is greater than or equal to twice the Rayleigh length divided by the propagation speed of the laser pulses in the atmosphere, and less than 20 µs; and
   activating the LIDAR system to get a speed value for particles which are contained in the focusing zone.

18. The anemometrical measurement process according to claim 17, wherein the temporal control device for the laser beam is adjusted so that the individual length of each laser pulse is between 0.5 and 1.2 times a coherence time of the atmosphere which is effective in the focusing zone.

19. The anemometrical measurement process according to claim 17, wherein the temporal control device for the laser beam is adjusted so that the individual length of each laser pulse is between 0.2 and 5 times a coherence time of the atmosphere which is effective in the focusing zone.

20. The LIDAR system according to claim 1, wherein the temporal control device is adapted so that the individual length of each laser pulse is between 0.5 µs and 1.2 µs.

* * * * *